US009352853B2

(12) United States Patent
Eskenazi et al.

(10) Patent No.: US 9,352,853 B2
(45) Date of Patent: May 31, 2016

(54) SOLAR ARRAYS, DEPLOYMENT MECHANISMS THEREFOR, AND RELATED METHODS

(71) Applicant: Orbital ATK, Inc., Dulles, VA (US)

(72) Inventors: Michael I. Eskenazi, Goleta, CA (US); Nicholas C. Wilder, Lompoc, CA (US); David M. Murphy, Santa Barbara, CA (US)

(73) Assignee: ORBITAL ATK, INC., Plymouth, MN (US)

( * ) Notice: Subject to any disclaimer, the term of this patent is extended or adjusted under 35 U.S.C. 154(b) by 183 days.

(21) Appl. No.: 13/804,331

(22) Filed: Mar. 14, 2013

(65) Prior Publication Data
US 2014/0263847 A1    Sep. 18, 2014

(51) Int. Cl.
*H01L 31/042* (2014.01)
*H02S 30/20* (2014.01)
(Continued)

(52) U.S. Cl.
CPC *B64G 1/222* (2013.01); *B64G 1/44* (2013.01); *H02S 20/00* (2013.01); *H02S 30/20* (2014.12); *Y02E 10/50* (2013.01)

(58) Field of Classification Search
CPC .......... B64G 1/222; B64G 1/443; B64G 1/44; B64G 9/00; H01L 31/042; H01L 31/0422; H01L 31/045; H01L 31/18; H01L 31/02008; Y02E 10/50; Y02E 10/47; H02S 20/00; H02S 30/20
USPC .......... 136/245, 292; 244/172.6, 172.7, 159.5
See application file for complete search history.

(56) References Cited

U.S. PATENT DOCUMENTS 3,706,230 A    12/1972  Low et al.
4,030,102 A     6/1977  Kaplan et al.
(Continued)

FOREIGN PATENT DOCUMENTS

DE         2042091 A1     3/1972
DE        10127292 A1    12/2002
(Continued)

OTHER PUBLICATIONS

Brian Spence, Steve White, Alan Jones, Jim Wachholz, Nick Wilder, Paul Cronin, Todd Gregory, Peter Barker, Tiffany Allmandinger, Nick Mardesich, Michael Piszcz, Paul Sharps, and Navid Fatemi, "UltraFlex-175 Solar Array Technology Maturation Achievements for NASA's New Millennium Program (NMP) Space Technology 8 (ST8)", 2006, pp. 1946-1950.*
(Continued)

*Primary Examiner* — Jayne Mershon
*Assistant Examiner* — Mayla Gonzalez Ramos
(74) *Attorney, Agent, or Firm* — TraskBritt

(57) ABSTRACT

Mechanisms for deploying a solar array include an elongated deployment member routed along a first panel, along an extension, and at least partially along a second panel. The elongated deployment member is configured to, upon retraction of the elongated deployment member by a deployment motor, move the extension into an extended position and rotate the second panel about a hub located at a distal end of the extension. Solar array assemblies include such a mechanism. Methods of deploying a solar array include retracting an elongated deployment member to rotate an extension into an extended position and further retracting the elongated deployment member to rotate a panel coupled to the extension approximately 360° about a hub of the extension.

10 Claims, 10 Drawing Sheets

(51) Int. Cl.
  *B64G 1/44* (2006.01)
  *B64G 1/22* (2006.01)
  *H01L 31/02* (2006.01)
  *H01L 31/18* (2006.01)

(56) References Cited

U.S. PATENT DOCUMENTS

| | | | |
|---|---|---|---|
| 4,401,710 | A | 8/1983 | Bansemir et al. |
| 4,552,438 | A | 11/1985 | Murphy |
| 4,599,832 | A | 7/1986 | Benton |
| 4,686,322 | A | 8/1987 | Kujas |
| 4,968,372 | A | 11/1990 | Maass et al. |
| 5,296,044 | A | 3/1994 | Harvey et al. |
| 5,296,139 | A * | 3/1994 | Hanson et al. ............ 210/297 |
| 5,578,139 | A * | 11/1996 | Jones et al. .............. 136/245 |
| 5,833,176 | A | 11/1998 | Rubin et al. |
| 5,909,860 | A | 6/1999 | Lee |
| 6,028,570 | A | 2/2000 | Gilger et al. |
| 6,091,016 | A | 7/2000 | Kester |
| 6,147,294 | A | 11/2000 | Dailey et al. |
| 6,177,627 | B1 | 1/2001 | Murphy et al. |
| 6,198,461 | B1 | 3/2001 | Chieusse et al. |
| 6,224,016 | B1 | 5/2001 | Lee et al. |
| 6,423,895 | B1 | 7/2002 | Murphy et al. |
| 6,555,740 | B2 | 4/2003 | Roth et al. |
| 6,624,351 | B2 | 9/2003 | Kular et al. |
| 6,637,702 | B1 | 10/2003 | McCandless |
| 6,689,952 | B2 | 2/2004 | Kawaguchi |
| 7,026,541 | B2 | 4/2006 | Heidrich |
| 7,301,095 | B2 | 11/2007 | Murphy et al. |
| 8,132,762 | B2 * | 3/2012 | Huang ................... 244/172.7 |
| 8,664,511 | B2 * | 3/2014 | Swatek et al. ............. 136/244 |
| 2003/0101565 | A1 | 6/2003 | Butler |
| 2003/0167666 | A1 | 9/2003 | Close |
| 2004/0016454 | A1 | 1/2004 | Murphy et al. |
| 2006/0127648 | A1 | 6/2006 | De Luca |
| 2009/0126775 | A1 * | 5/2009 | White et al. ............... 136/245 |

FOREIGN PATENT DOCUMENTS

| | | |
|---|---|---|
| EP | 1038464 A2 | 9/2000 |
| JP | 2002154499 A | 5/2002 |
| JP | 2006188201 A | 7/2006 |

OTHER PUBLICATIONS

Mike Eskenazi, Steve White, Brian Spence, Mark Douglas, Mike Glick, Ariel Pavlick, and David Murphy, "Promising Results From Three NASA SBIR Solar Array Technology Development Programs", publised 2005, pp. 59-94.*

Murphy, D., Presentation given on Apr. 24, 2012, Megaflex—The Scaling Potential of Ultraflex, 53rd AIAA/ASME/ASME/ASCE/AHS/ASC Structures, Structural Dynamics and Materials Conference, 13th Gossamer Spacecraft Forum, Apr. 23-26, 2012, 15 pages.

Murphy et al., Advanced Solar Array Technology, SPRAT XXII, Presentation given on Sep. 22, 2011, Cleveland Ohio, 22 pages.

* cited by examiner

SOLAR ARRAYS, DEPLOYMENT MECHANISMS THEREFOR, AND RELATED METHODS

CROSS-REFERENCE TO RELATED APPLICATION

The subject matter of the present application is related to the subject matter of U.S. patent application Ser. No. 11/944,061, filed Nov. 21, 2007, titled "SOLAR ARRAYS," pending, the disclosure of which is incorporated herein in its entirety by this reference.

TECHNICAL FIELD

Embodiments of the present disclosure relate to solar energy harvesting arrays that may be stowed in a folded configuration and mechanisms for deploying such arrays, as well as to methods of deploying such solar energy harvesting arrays, such as solar energy harvesting arrays for space vehicles and satellites.

BACKGROUND

Solar arrays are used for space vehicles and satellites to generate electrical current for power. For example, satellites including solar arrays may use the power generated by the solar arrays for so-called "solar electric propulsion" (SEP) or to power onboard computing elements. The capacity of the solar array to produce electrical current is directly related to an exposed surface area of the array having solar cells thereon. A solar array is stowed during launch of the space vehicle or satellite. Thus, the solar array occupies a relatively small volume and has a relatively low weight, while having a relatively large surface area of solar cells for electrical current generation after subsequent deployment.

Solar arrays used for space vehicles and satellites need to achieve a high degree of stiffness and stability after deployment, which requirement runs counter to having a low volume and weight when stowed for launch. Generally circular arrangements offer a large deployed area with a high deployed stiffness. Thus, one type of solar array is a multi-panel solar array having the general shape of a circle formed of triangular or trapezoidal solar blankets, also referred to as "gores," of the solar array. The gores are folded and stacked to provide a low volume when stowed. In this manner, the gores can be supported and deployed about a hub attached thereto by means of spars attached to brackets attached to the hub.

Alternatively, rectangular solar blankets may be used where the blanket is folded in an accordion arrangement for deployment between panels connected by a hinged pantograph or deployable boom deployment structure.

SUMMARY

In some embodiments, the present disclosure includes mechanisms for deploying a solar array. Such mechanisms include an elongated deployment member operatively coupled to a deployment motor. The elongated deployment member is routed along a first panel, along an extension, and at least partially along a second panel. The elongated deployment member is configured to, upon retraction of the elongated deployment member by the deployment motor, move the extension into an extended position and rotate the second panel about a hub located at a distal end of the extension.

In other embodiments, the present disclosure includes solar array assemblies. Such solar array assemblies include a solar array gore assembly, an extension, and an elongated deployment member. The solar array gore assembly includes a first panel, a second panel, and a plurality of solar array gores. The solar array gores are folded and positioned between the first panel and the second panel when the solar array assembly is stowed. When the solar array assembly is fully deployed, the solar array gores extend generally circularly from the first panel to the second panel. The extension includes a first member pivotally coupled to the first panel, a second member pivotally coupled to the second panel, and a hub pivotally coupling the first member to the second member. The elongated deployment member is configured to, upon initial retraction thereof, rotate the extension relative to the solar array gore assembly into an extended position and, upon further retraction thereof, rotate the second panel and the second member relative to the first panel and the first member to deploy the plurality of solar array gores.

In additional embodiments, the present disclosure includes methods of deploying a stowed solar array. In accordance with such methods, an elongated deployment member is retracted using a deployment motor to rotate an extension from a stowed position into an extended position. The elongated deployment member is further retracted using the deployment motor to rotate a panel coupled to the extension approximately 360° about a hub of the extension.

DETAILED DESCRIPTION

Figure 1:
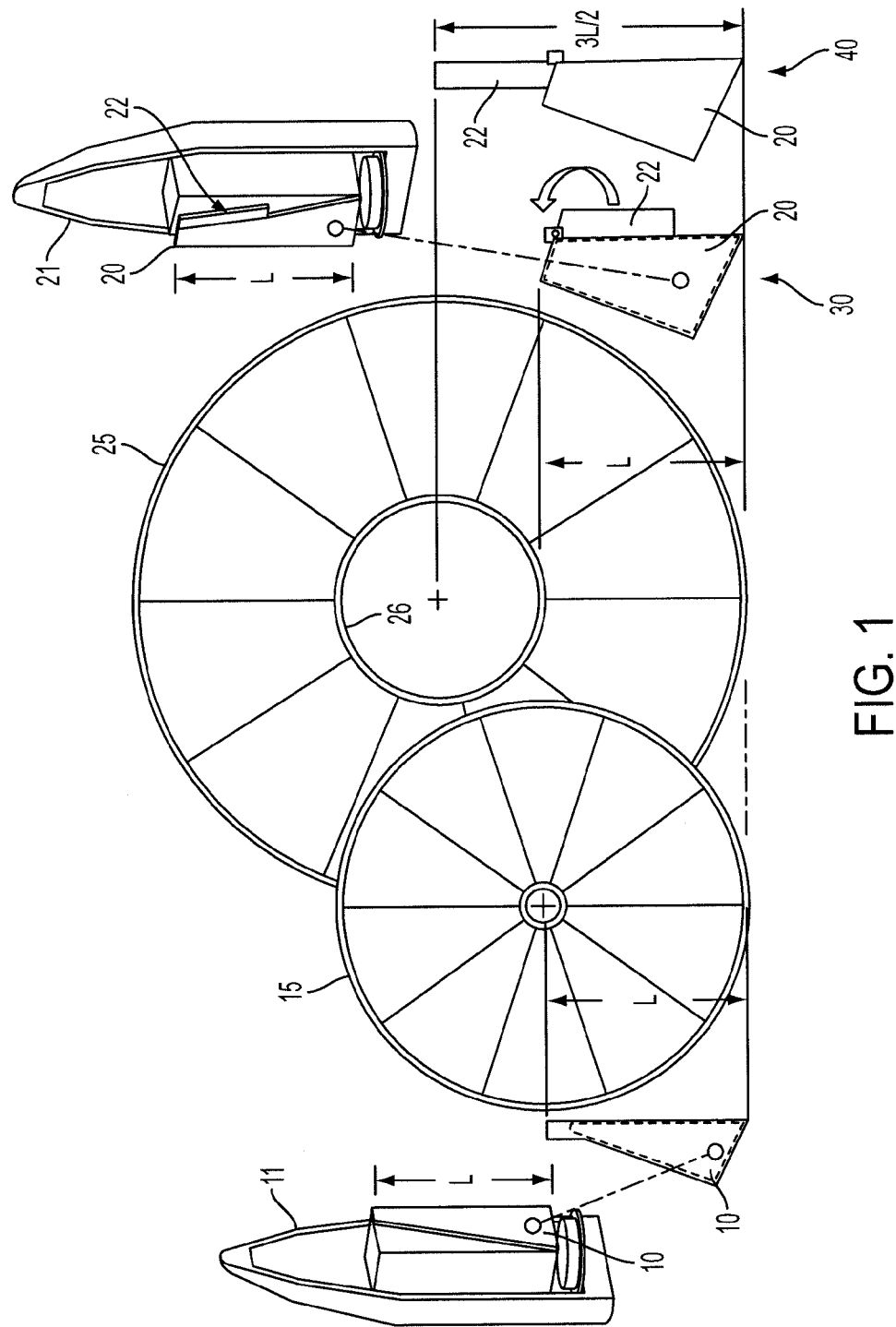
FIG. 1 is a graphic illustration showing differences between a known generally circular solar array and a generally circular solar array according to the present disclosure.

The following description provides specific details in order to provide a thorough description of embodiments of the present disclosure. These embodiments are described in sufficient detail to enable a person of ordinary skill in the art to practice the present disclosure. However, a person of ordinary skill in the art will understand that the embodiments of the present disclosure may be practiced without employing these specific details. Other embodiments may be utilized, and structural and operational changes may be made without departing from the scope of the disclosure. Indeed, the embodiments of the present disclosure may be practiced in conjunction with conventional techniques employed in the industry.

In the following detailed description, reference is made to the accompanying drawings, which form a part hereof, and in which is shown, by way of illustration, specific embodiments in which the present disclosure may be practiced. The illustrations presented herein are not meant to be actual views of any particular system, device, structure, or process, but are merely idealized representations which are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or other property.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, any relational term, such as "first," "second," "third," "around," "along," "lower," etc., is used for clarity and convenience in understanding the disclosure and accompanying drawings and does not connote or depend on any specific preference, orientation, or order, except where the context clearly indicates otherwise.

Embodiments of the present disclosure include generally circular solar arrays that have an increased surface area when deployed compared to prior known circular solar arrays having a comparable stowed length. Accordingly, a higher power solar array can fit into a space vehicle or satellite of a certain size compared to prior known solar arrays. Such benefits, and others, may be accomplished by including an extension that may be folded against the stowed solar array. To deploy the solar array, the extension is first rotated into an extended position, after which gores of the solar array including solar cells are rotated about a hub at an end of the extension and unfolded. The extension effectively increases a radius of the deployed solar array by the length of the extension. Rotation of the extension and of the gores may be accomplished using a single tape drive including a deployment tape that is routed along a static panel, around a first tape guide positioned proximate a base of the extension, along a side the extension, around a second tape guide positioned proximate a distal end of the extension, along an opposing side of the extension, around a third tape guide positioned proximate the base of the extension, and at least partially along a pivot panel. As the deployment tape is drawn toward a base of the static panel by a motor, the extension rotates into the extended position, after which the pivot panel releases from its initial position proximate a first side of the static panel and rotates about the hub, until the pivot panel reaches a fully deployed position on a second, opposite side of the static panel.

Referring to FIG. 1, for example, a prior known solar array 10 may be folded and stowed in a rocket fairing 11, the stowed solar array 10 having a length of L. When deployed, a surface area of gores of the solar array 10, which may include solar cells for harvesting solar energy, may be approximated using a circle 15 of radius L. Using the well-known formula for the surface area of a circle, $A \times \pi R^2$ where A is the surface area, $\pi$ is a constant, and R is the radius, the potential surface area for the prior known solar array 10 may be about $\pi L^2$. By way of comparison, a solar array 20 according to an embodiment of the present disclosure may be folded and stowed in a rocket fairing 21, the stowed solar array 20 also having a length of L. An extension 22 of the solar array 20 may be folded alongside the solar array 20 when stowed, as shown generally at 30. In the embodiment shown in FIG. 1, the extension 22 has a length of about L/2. To initiate deployment of the solar array 20, the extension 22 may be rotated into an extended position and the length of the solar array 20 with the extension 22 in the extended position is about 3L/2, shown generally at 40. To finish deployment of the solar array 20, the solar array 20 may be opened by rotating gores about a distal end of the extension 22. The surface area of the deployed solar array 20 may be approximated using an outer circle 25 of radius 3L/2, less an area of an inner circle 26 having a radius of L/2, which may lack solar cells in some embodiments. Subtracting the area of the inner circle 26, where the extension 22 is positioned, from the area of the outer circle 25, the potential surface area for the solar array 20 of the present disclosure may be about $2\pi L^2$. Accordingly, by providing the extension 22 having a length of about L/2, the potential surface area of the gores of the solar array 20 of the present disclosure having a stowed length of L may be about double the potential surface area of the gores of the prior known solar array 10 also having a stowed length of L. As a result of the increased potential surface area, electrical power produced by the solar array 20 of the present disclosure may be, potentially, about double the potential electrical power produced by the prior known solar array 10.

The length of the extension 22 may be altered to alter the gains in available surface area. For example, if the extension 22 is about L, then the radius of the resulting deployed solar array 20 would be about 2L and the potential surface area of the solar array 20 (not counting an inner circle of radius L) would be about three times the potential surface area of the prior known solar array 10 having a radius of L. Similarly, a shorter extension 22 would exhibit a smaller gain in potential surface area for the solar array 20, although an extension 22 of any length may provide some gains in potential surface area for the solar array 20 compared to the prior known solar array 10 without the extension 22. By way of example and not limitation, the extension 22 of the present disclosure may have a length of between about L/4 and about L, which may result in a potential area of the solar array 20 of between about $1.5\pi L^2$ and about $3\pi L^2$, if solar cells are not present in a central area covered by the extension 22. In some embodiments, the extension 22 may have a length of between about L/3 and L/2, where L is the length of the stowed solar array 20.

An example embodiment of a solar array 100 of the present disclosure and some of its components will be explained, in conjunction with a method of deploying the solar array 100, with reference to FIGS. 2 through 12.

Figure 2:
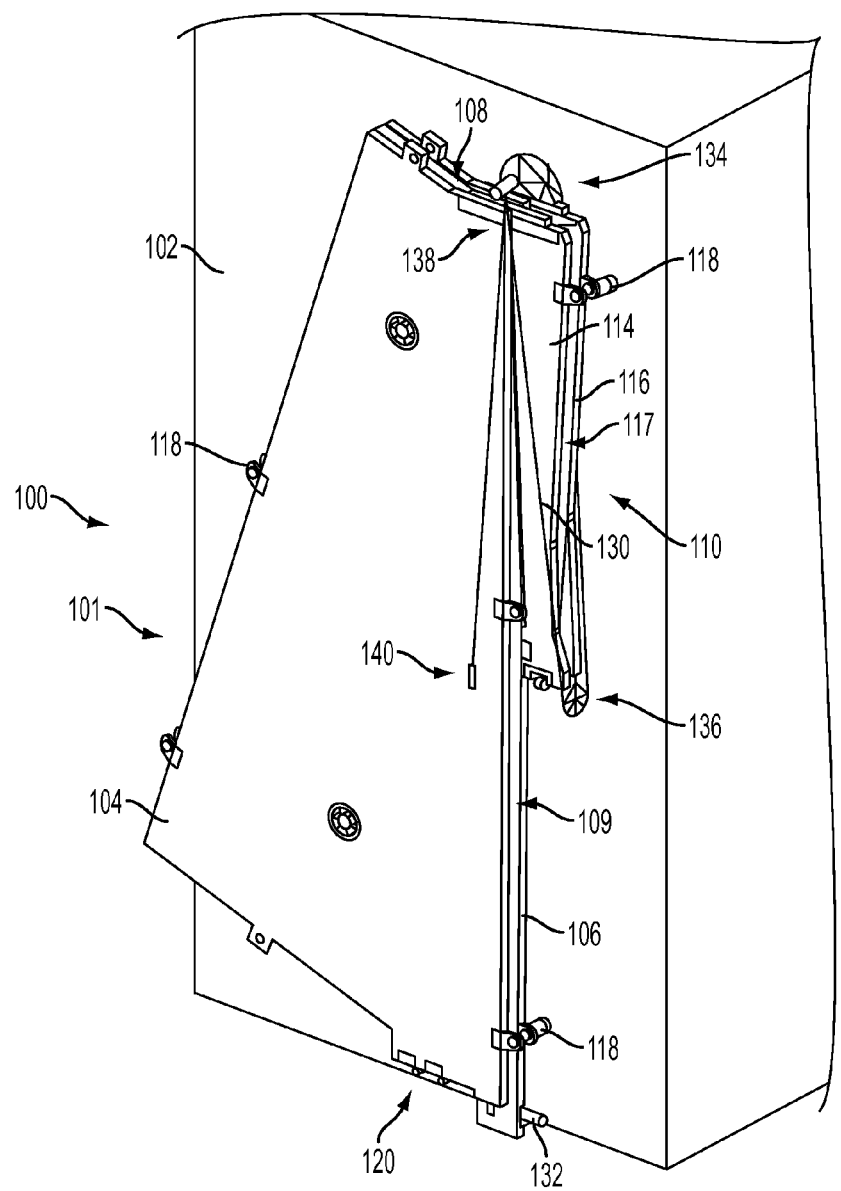
FIG. 2 is a perspective view showing an embodiment of a solar array according to the present disclosure in a stowed position.

Referring to FIG. 2, the solar array 100 may be stowed and coupled to a support structure 102 for supporting the solar array 100, from which the solar array 100 is to be deployed. The support structure 102 may be a structure of a space vehicle, satellite, or rocket, for example. The solar array 100 may include a gore assembly 101, which includes a pivot panel 104 and a static panel 106 on either side of a stack of folded solar array gores 108 and gore spars 109. The solar array 100 may also include an extension 110, which may be pivotally coupled to the gore assembly 101 at a longitudinal end of the gore assembly 101 opposite the support structure 102 when the static panel 106 is deployed (see FIG. 3). The extension 110 may include a pivot member 114 that is pivotally coupled to the pivot panel 104 and a static member 116 that is pivotally coupled to the static panel 106. A plurality of extension spars 117 may be positioned between the pivot member 114 and the static member 116 of the extension 110. Each of the extension spars 117 may be pivotally coupled to a respective gore spar 109. The static panel 106 and the static member 116 are referred to herein as "static" because each remains in a fixed position relative to the support structure 102 during unfolding of the solar array gores 108 during deployment. Somewhat more generically, the static panel 106 is also referred to herein as the "first panel" and the static member 116 of the extension 110 is also referred to herein as the "first member" of the extension 110. The pivot panel 104 and the pivot member 114 include the term "pivot" because each rotates during unfolding of the solar array gores 108 during deployment. Somewhat more generically, the pivot panel 104 is also referred to herein as the "second panel" and the pivot member 114 of the extension 110 is also referred to herein as the "second member" of the extension 110.

In its stowed position, the solar array 100 may be held proximate and along the support structure 102 by one or more releasable retaining elements 118. The solar array 100 may also be coupled to the support structure 102 by a hinge 120 connecting the support structure 102 to the static panel 106. The extension 110 may be positioned proximate to and along a side of the gore assembly 101, such that the extension 110 does not add any significant length to the solar array 100 when in a stowed position.

Figure 3:
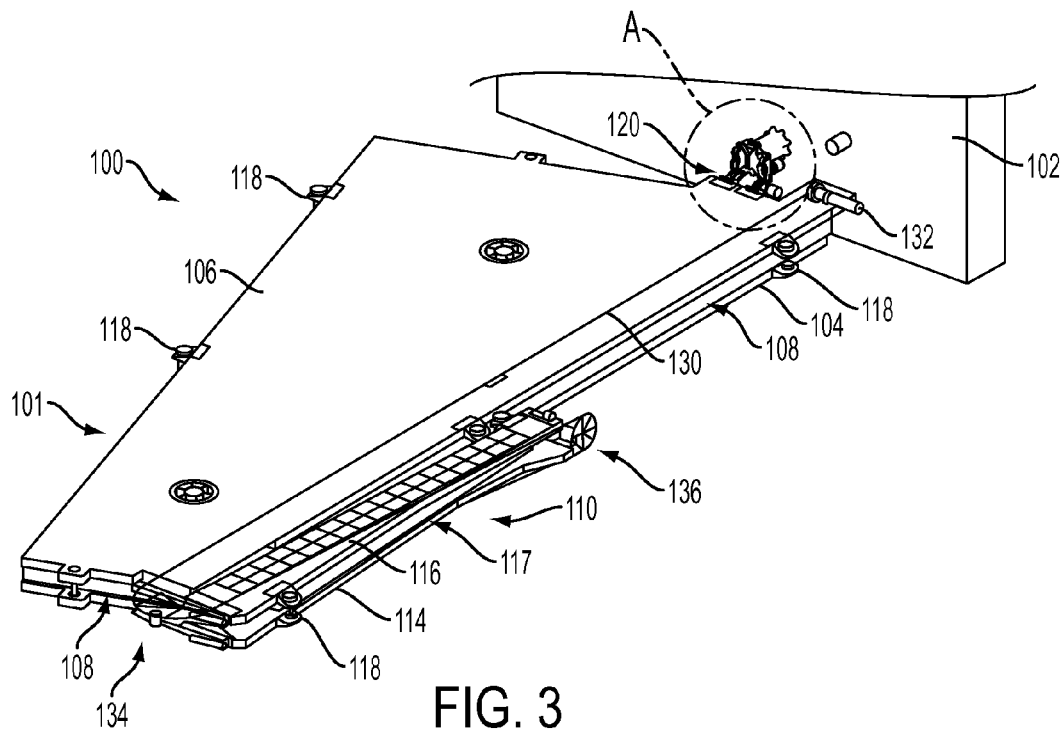
FIG. 3 is a perspective view showing the solar array of FIG. 2 in a staged position.
Figure 4:
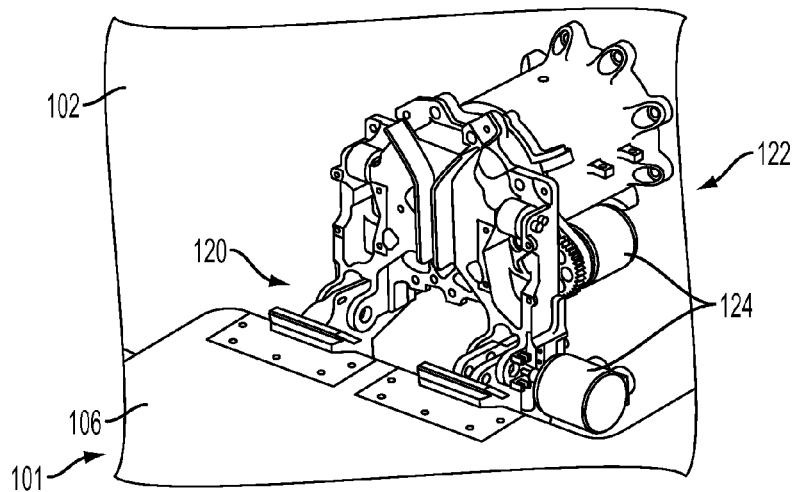
FIG. 4 is an enlarged perspective view showing a portion of the solar array of FIG. 2, as indicated at dashed circle A of FIG. 3.

To initiate deployment of the solar array 100, the solar array 100 may be rotated from the stowed position shown in FIG. 2 into a so-called "staged position" in which the solar panel 100 extends from the support structure 102 at about ninety degrees (90°) compared to the stowed position, as shown in FIG. 3. The one or more releasable retaining elements 118 that hold the solar array 100 proximate and along the support structure 102 may be released to enable the solar array 100 to be rotated away from the support structure 102 about the hinge 120. Referring to FIGS. 3 and 4, the hinge 120 may include a biasing member (e.g., a spring) that biases the solar array 100 into the staged position. The hinge 120 may be coupled to the support structure 102 through a gimbal assembly 122. The gimbal assembly 122 may include one or more stepper motors 124 that may be used to rotate the solar array 100, when fully deployed, into a desired position, such as to direct solar cells thereof toward the sun for increased solar energy harvesting efficiency.

As shown in FIG. 3, the static panel 106 may be coupled to the pivot panel 104 using one or more releasable retaining elements 118, to inhibit the solar array gores 108 from unfolding and partially or fully deploying prior to moving the extension 110 into its fully extended position, as will be explained in more detail below. In addition, one or more releasable retaining elements 118 may also be used to inhibit the pivot member 114 from pivoting relative to the static member 116 of the extension 110 prior to the extension 110 reaching its fully extended position.

Referring to FIG. 3 in conjunction with FIG. 2, a deployment tape 130 may be routed to enable retraction of the single deployment tape 130 (or a series of deployment tapes connected end-to-end) to both move the extension 110 into the fully extended position and rotate the pivot panel 104 from the staged position into a fully deployed position (see FIG. 11), to fully deploy the solar panel gores 108. For example, the deployment tape 130 may be coupled (e.g., attached) to a deployment motor 132, extend along the static panel 104, pass around a first deployment tape guide 134 positioned at an end of the static panel 106, extend along the static member 116 of the extension 110, pass around a second deployment tape guide 136 positioned at an end of the extension 110 (also referred to herein as the "distal end" of the extension 110), extend along the pivot member 114 of the extension 110, pass around a third deployment tape guide 138 positioned at an end of the pivot panel 104, extend at least partially along the pivot panel 104, and be coupled to a point 140 on the pivot panel 104. The deployment tape 130 may be, for example, a metal tape, a composite tape (e.g., a fibrous composite tape), a polymer tape, etc. The deployment motor 132 may be configured to retract the deployment tape 130, such as by winding the deployment tape 130 around a drive shaft of the deployment motor 132. The deployment motor 132 may be positioned proximate a longitudinal end of the static panel 106 proximate the support structure 102 when the static panel 106 is deployed (e.g., in the staged position or the fully deployed position).

Although the embodiment shown in FIGS. 2 and 3 includes the deployment tape 130 in tape form, the present disclosure is not so limited. By way of example and not limitation, any elongated deployment member may be used, such as a chain, rope, or wire, that can be routed in the manner shown and retracted to cause deployment of the extension 110, pivot member 114 of the extension 110, pivot panel 104, and/or the solar array gores 108, as will be explained in more detail below. Furthermore, although the point 140 where the deployment tape 130 is coupled to the pivot panel 104 is shown in FIG. 2 as being located approximately midway along a length of the pivot panel 104, in other embodiments, the point 140 may be located at another position on the pivot panel 104, such as at a lower end of the pivot panel 104 when viewed in the perspective of FIG. 2.

Figure 5:
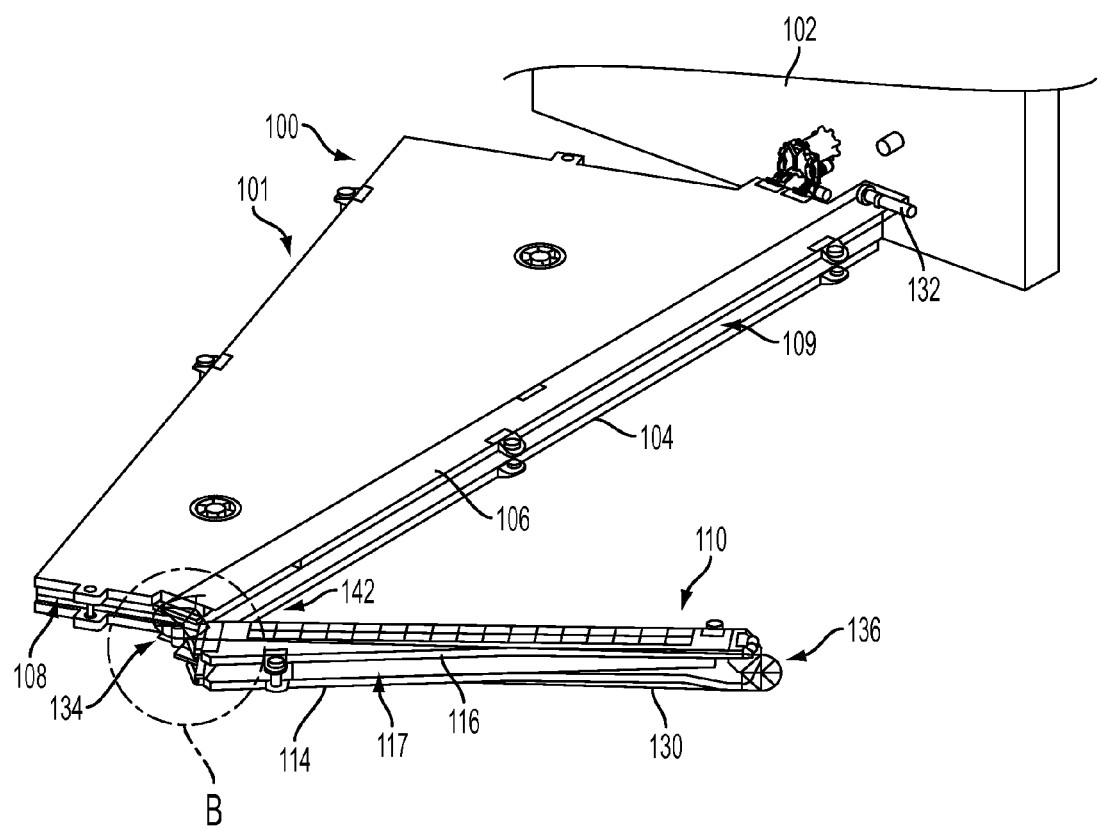
FIG. 5 is a perspective view showing the solar array of FIG. 2 during rotation of an extension thereof into an extended position.

Referring to FIG. 5, after the solar array 100 reaches the staged position, the deployment tape 130 may be retracted by the deployment motor 132 to begin rotating the extension 110 into an extended position. The first deployment tape guide 134 may be configured to cause the deployment tape 130 to be routed around a hinged connection 142 between the gore assembly 101 and the extension 110 at a distance from the hinged connection 142 sufficient to create torque on the extension 110 about a rotational axis defined by the hinged connection 142. Thus, as the deployment tape 130 is initially retracted by the deployment motor 132, the extension 110 may rotate about the hinged connection 142.

Figure 6:
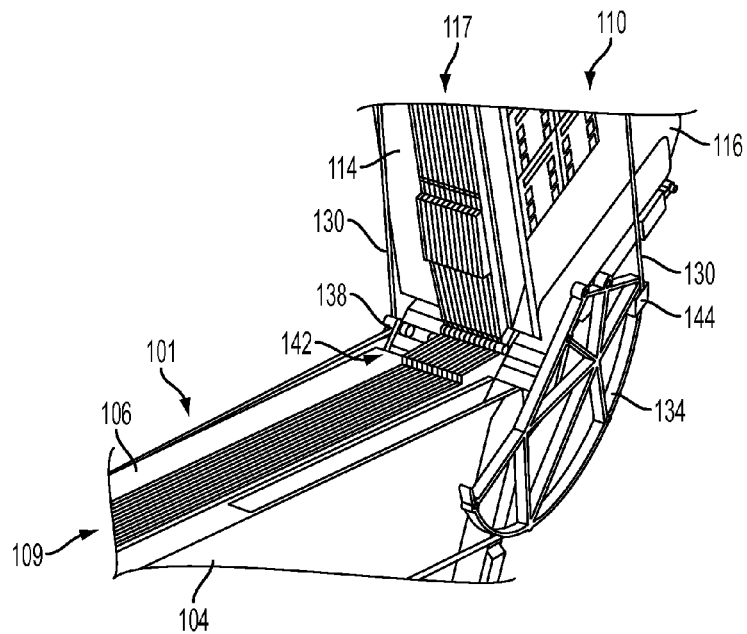
FIGS. 6 and 7 are enlarged perspective views showing a portion of the solar array of FIG. 2, as indicated at dashed circle B of FIG. 5.
Figure 7:
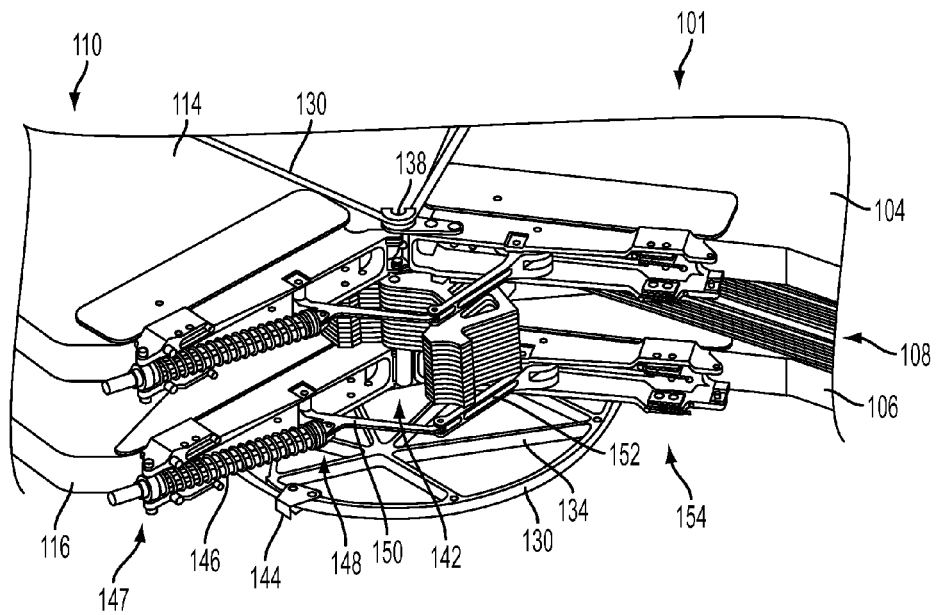

FIGS. 6 and 7 illustrate two views of a portion of the solar array 100 where the extension 110 is coupled to the gore assembly 101, as generally indicated by the dashed circle B of FIG. 5. As shown in FIGS. 6 and 7, the extension 110 may be coupled to the gore assembly 101 by the hinged connection 142. The hinged connection 142 may include a plurality of hinges, including individual hinges (see FIG. 6) between the static panel 106 and the static member 116, between respective gore spars 109 and extension spars 117, and between the pivot panel 104 and the pivot member 114. The deployment tape 130 may be directed around the first deployment tape guide 134 positioned at the hinged connection 142 and proximate the static panel 106 and the static member 116 of the extension 110. The first deployment tape guide 134 may include one or more brackets 144 for maintaining the deployment tape 130 in a desired position relative to the first deployment tape guide 134 (e.g., in contact with a guide surface of the first deployment guide 134). As noted above, the first deployment tape guide 134 may be configured to position the deployment tape 130 a distance from the hinged connection 142 to enable a torque to be applied to the extension 110 about the hinged connection 142 when the deployment tape 130 is placed under tension. The deployment tape 130 may also extend around the third deployment tape guide 138 positioned at the hinged connection 142 and proximate the pivot panel 104 and the pivot member 114 of the extension 110. In contrast to the first deployment tape guide 134, in some embodiments, the third deployment tape guide 138 may not position the deployment tape 130 a significant distance from the hinged connection 142. Rather, the third deployment tape guide 138 may position the deployment tape 130 approximately along an axis of rotation defined by the hinged connection 142.

Referring to FIG. 7, in some embodiments, one or more springs 146 may, optionally, be operatively coupled to the extension 110 between the extension 110 and the gore assembly 101. The one or more springs 146 may provide a motive force in addition to the force provided by the retraction of the deployment tape 130, to assist in the rotation of the extension 110 from the staged position into a fully extended position. In addition, after the extension 110 reaches the fully extended position, the one or more springs 146 may provide a spring force to retain the extension 110 in its fully extended position. A first end 147 of each of the one or more springs 146 may be pivotally coupled to the extension 110, and a second, opposite end 148 may be pivotally coupled to a first linking member 150. A first end of the first linking member 150 may also be pivotally coupled to the extension 110 and a second, opposite end of the first linking member 150 may be pivotally coupled to a second linking member 152. The second linking member 152 may be pivotally coupled to the gore assembly 101. Thus, the one or more springs 146 may be configured to pull on the first linking member 150, which, in turn, may pull on the second linking member 152 and gore assembly 101 to provide additional force to assist in the rotation of the extension 110 into a fully extended position and to retain the extension 110 in the fully extended position relative to the gore assembly 101. In some embodiments, a first spring 146 (with corresponding first and second linking members 150, 152) may be operatively coupled to the pivot member 114 of the extension 110, and a second spring 146 (with corresponding first and second linking members 150, 152) may be operatively coupled to the static member 116 of the extension 110, as shown in FIG. 7.

One or more limit switches 154 or other position indicators may be used to detect and confirm that the extension 110 is in a fully extended position. For example, a first limit switch 154 may be configured to detect and confirm that the pivot member 114 of the extension 110 is in a fully extended position relative to the pivot panel 104, and a second limit switch 154 may be configured to detect and confirm that the static member 116 of the extension 110 is in a fully extended position relative to the static panel 116.

Figure 8:
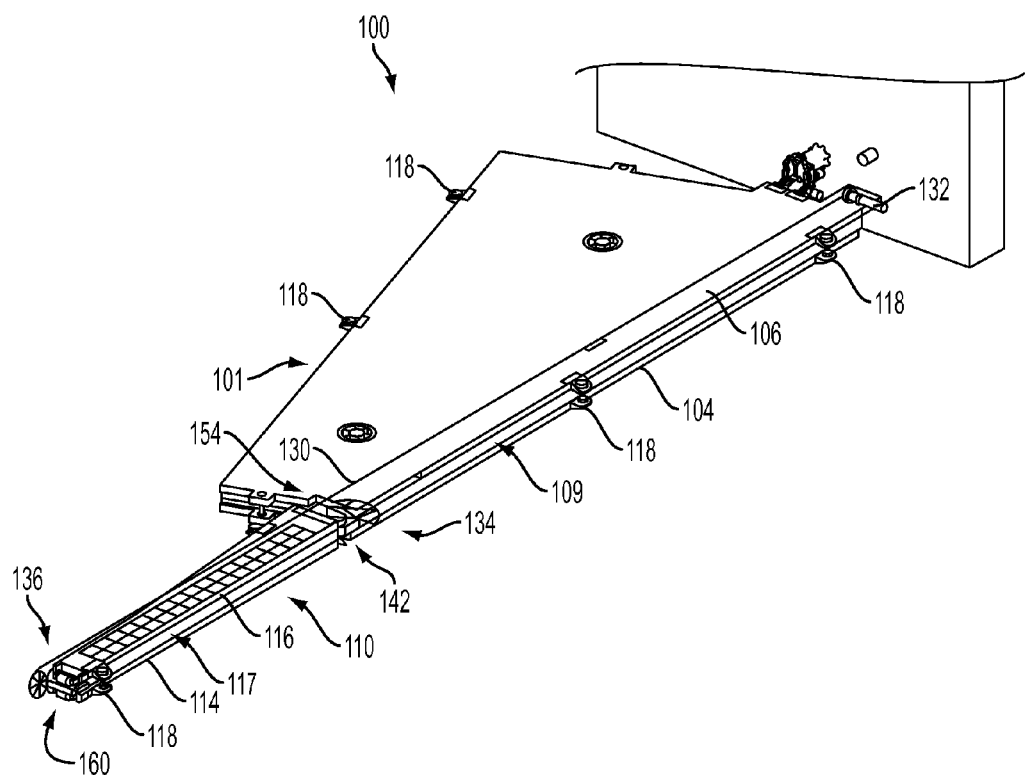
FIG. 8 is a perspective view showing the solar array of FIG. 2 with the extension thereof in the extended position.

Referring to FIG. 8, the initial retraction of the deployment tape 130 using the deployment motor 132 may position the extension 110 into the fully extended position. In the fully extended position, each of the extension spars 117 may be substantially collinear with a respective one of the gore spars 109. As shown in FIG. 8, during the process of extending the extension 110, the deployment tape 130 may become at least partially disengaged with the first deployment tape guide 134. For example, the one or more brackets 144 (FIGS. 6 and 7) of the first deployment tape guide 134 may include a gap or slot configured to enable the deployment tape 130 to pass therethrough and become disengaged with the first deployment tape guide 134 as the extension 110 is rotated. In addition, the first deployment tape guide 134 may rotate away from the deployment tape 130 as the extension 110 is rotated, as shown in FIG. 8. The deployment tape 130 may also become disengaged with the third deployment tape guide 138 (FIGS. 6 and 7) when the extension 110 is in the fully extended position. The deployment tape 130 may still be engaged with the second deployment tape guide 136 positioned at the distal end of the extension 110 to enable further deployment of the solar array 100.

When the extension 110 is in the fully extended position, as shown in FIG. 8, the deployment tape 130 may extend from the deployment motor 132 along the static panel 106, along the static member 116 of the extension 110, at least partially around the second deployment tape guide 136, along the pivot member 114 of the extension 110, and along the pivot panel 104 to the point 140 (FIG. 2) on the pivot panel 104 to which the deployment tape 130 is coupled.

The pivot panel 104 and the pivot member 114 may be coupled to each other using the hinged connection 142 and, optionally, using a spring 146 (see FIG. 7). Similarly, the static panel 106 and the static member 116 may be coupled to each other using the hinged connection 142 and, optionally, using another spring 146. The pivot panel 104 and the pivot member 114 may be pivotally coupled to the static panel 106 and the static member 116 using a hub 160 at the distal end of the extension 110. The hub 160 may define an axis of rotation that is generally orthogonal to an axis of rotation defined by the hinged connection 142. After the extension 110 is moved into the fully extended position, the one or more releasable retaining elements 118 coupling the pivot panel 104 to the static panel 106 and coupling the pivot member 114 to the static member 116 may be released.

Figure 9:
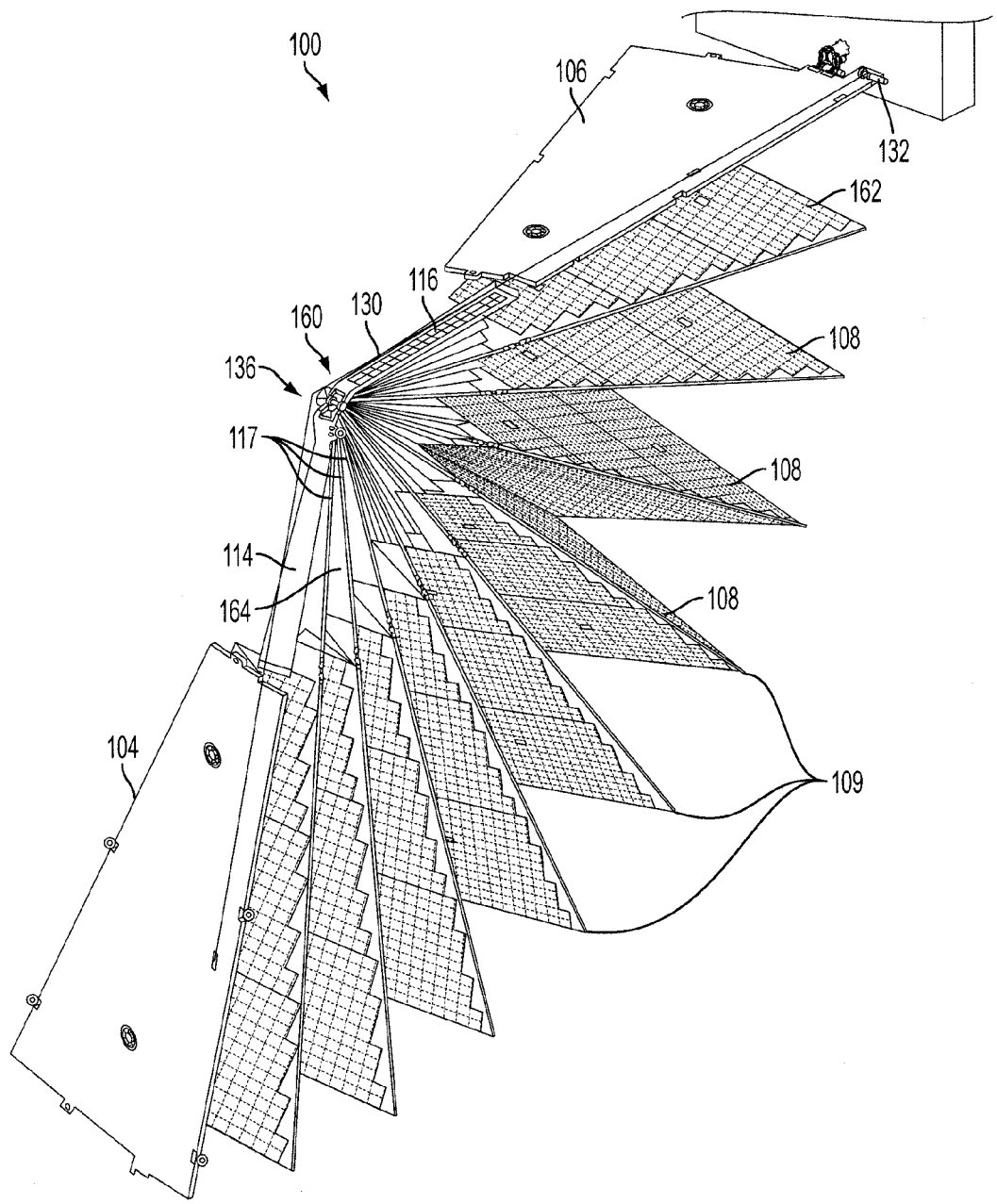
FIG. 9 is a perspective view showing the solar array of FIG. 2 during unfolding of solar array gores thereof.

Referring to FIG. 9, the deployment tape 130 may be further retracted by the motor 132 to rotate the pivot panel 104 and the pivot member 114 about the hub 160 to unfold and deploy the solar array gores 108. Each of the solar array gores 108 may include a plurality of solar cells 162 for harvesting solar energy arranged on a substrate (e.g., a sheet or membrane of material) that is folded when stowed. The gore spars 109 may be positioned between respective adjacent solar array gores 108, and may structurally support the solar array gores 108. The gore spars 109 may be coupled to the hub 160 through the extension spars 117. An edge of the solar array gore 108 closest to the static panel 106 may be coupled to the static panel 106, and an edge of the solar array gore 108 closest to the pivot panel 104 may be coupled to the pivot panel 104. Thus, as the deployment tape 130 is further retracted and the pivot panel 104 and pivot member 114 are rotated about the hub 160, the solar array gores 108 may unfold. A central sheet or membrane 164, which may initially be folded between adjacent extension spars 117 and between the pivot member 114 and the static member 116 of the extension 110 when stowed, may also unfold during deployment. The central sheet or membrane 164 may provide proper spacing between the extension spars 117 when the solar array 100 is deployed. In some embodiments, the central sheet or membrane 164 may also include additional solar cells 162 to increase the potential power produced by the solar array 100. In other embodiments, the central sheet or membrane 164 may be omitted from the solar array 100.

Figure 10:
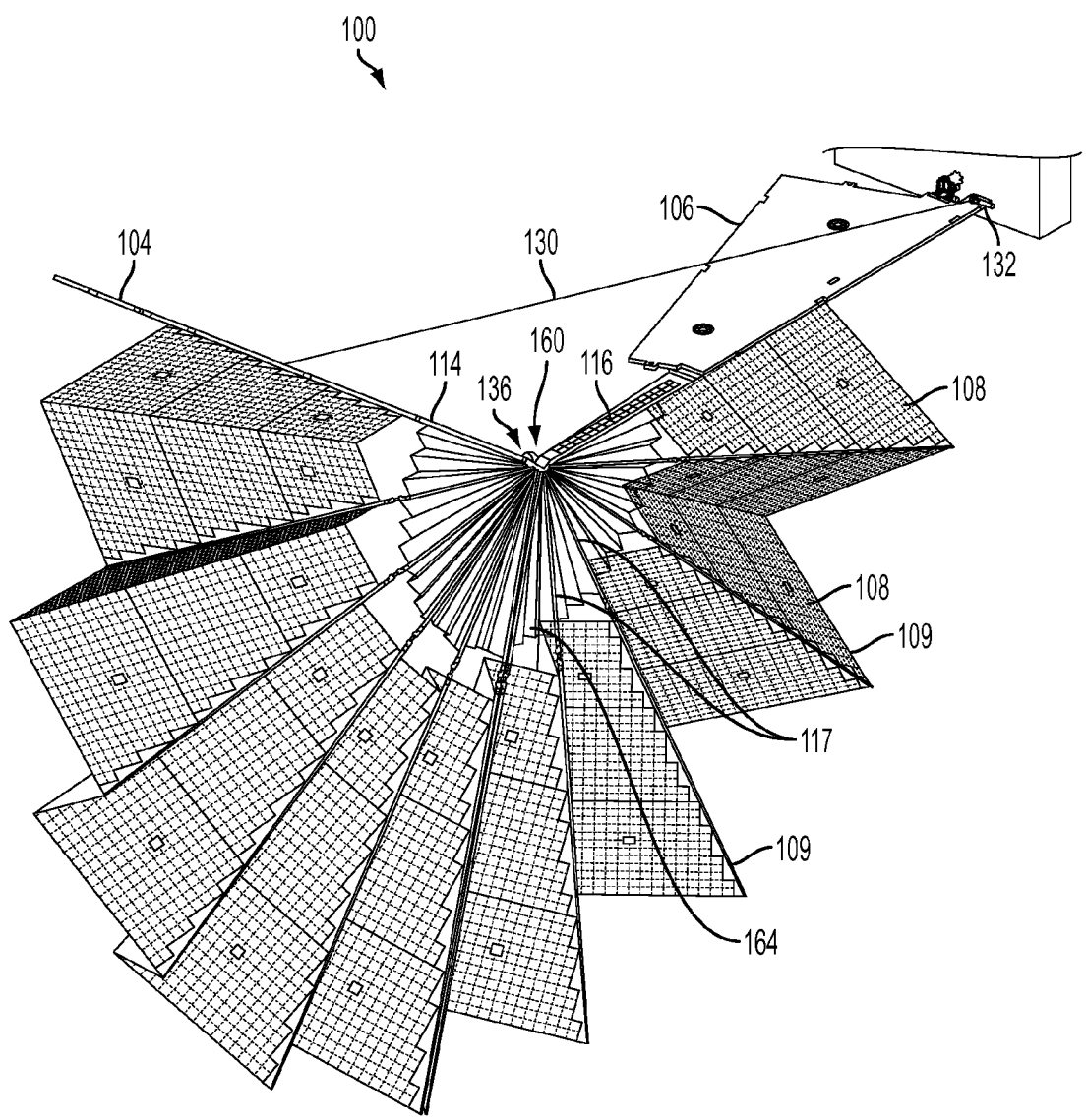
FIG. 10 is a perspective view showing the solar array of FIG. 2 after further unfolding of the solar array gores thereof.

Referring to FIG. 10, as the deployment tape 130 continues to be retracted, the pivot panel 104 and the pivot member 114 of the extension 110 may continue to rotate about the hub 160. At some point in the rotation past when the pivot panel 104 and pivot member 114 are directly opposite (i.e., positioned 180° from) the static panel 106 and static member 116, the deployment tape 130 may become disengaged from the second deployment tape guide 136. After such disengagement, the deployment tape 130 may extend directly from the motor 132 to the pivot panel 104. The solar array gores 108 may continue to unfold as the deployment tape 130 is retracted by the deployment motor 132.

Figure 11:
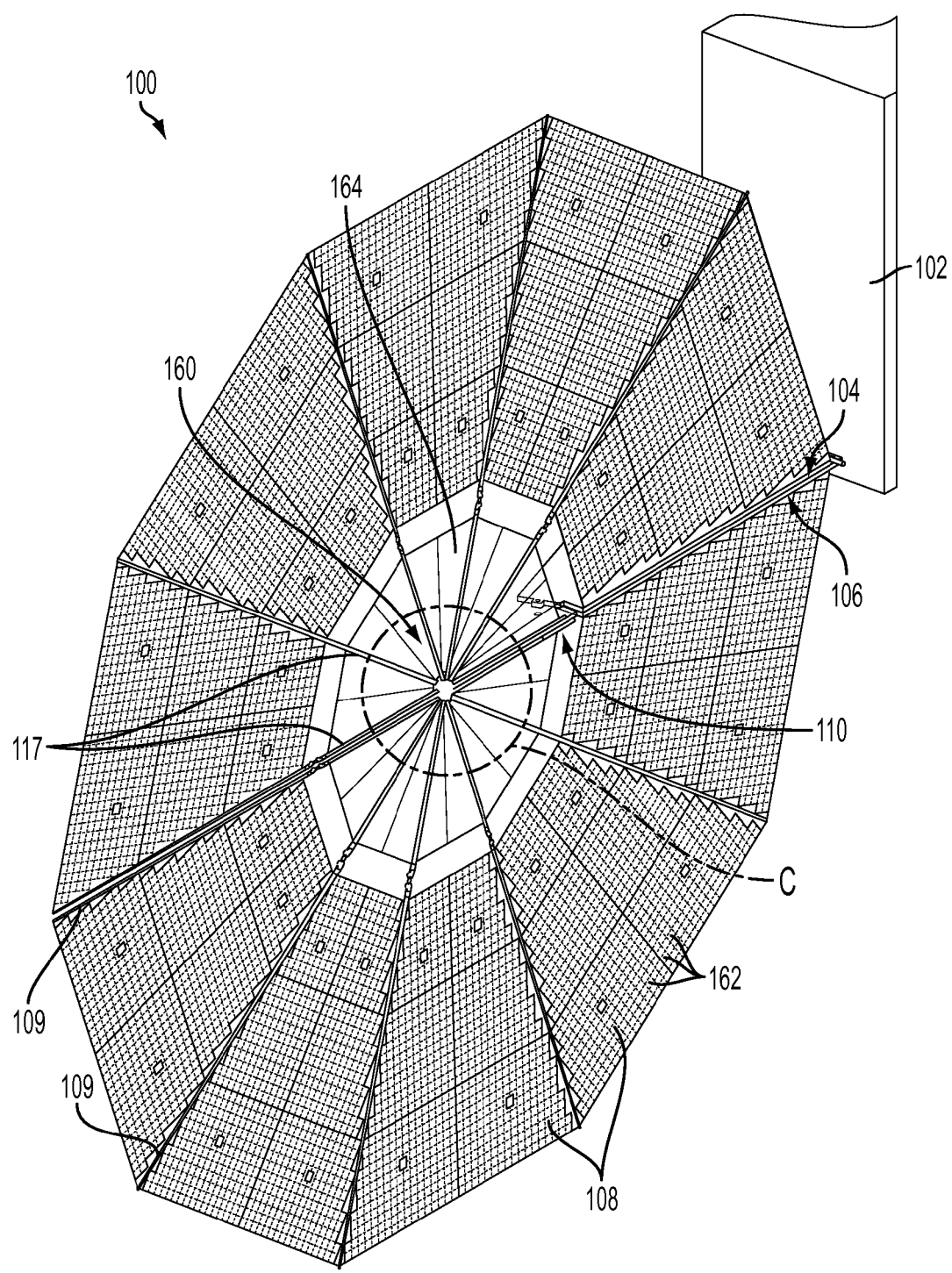
FIG. 11 is a perspective view showing the solar array of FIG. 2 in a fully deployed position.

Referring to FIG. 11, when the pivot panel 104 has rotated approximately 360° about the hub 160 and is positioned along and proximate the static panel 106, the solar array 100 may be in a fully deployed position. One or more latches or other retaining members may be used to couple the pivot panel 104 to the static panel 106. The solar array gores 108 may be substantially fully unfolded and planar, and may form a generally circular array of solar cells 162. Thus, the solar array gores 108 may extend generally circularly from the pivot panel 104 to the static panel 106, when fully deployed. A central region defined by the extension 110 and the extension spars 117 may or may not include additional solar cells 162 on the central sheet or membrane 164, as explained above.

Figure 12:
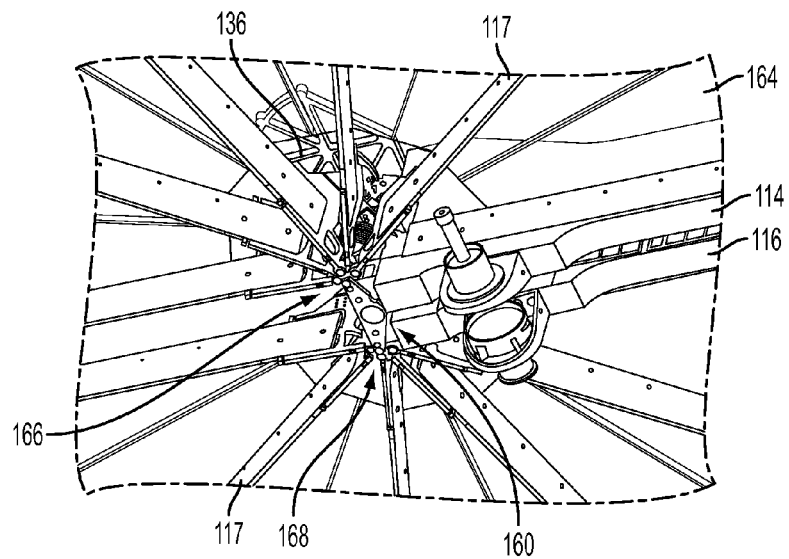
FIG. 12 is an enlarged perspective view showing a portion of the solar array of FIG. 2, as indicated at dashed circle C of FIG. 11.

Referring to FIG. 12, a central region of the fully deployed solar array 100 is shown, as indicated at the dashed circle C of FIG. 11, to illustrate additional features of the solar array 100 proximate the hub 160. The hub 160 may be configured to enable the pivot member 114 and the pivot panel 104 (FIG. 11) to rotate approximately 360° from the stowed position to the fully deployed position while providing space for components of the solar array 100 (e.g., the extension spars 117, the central sheet or membrane 164, the solar array gores 108 (FIG. 11), the gore spars 109 (FIG. 11)) to be positioned between the pivot panel 104 and the static panel 106 and/or between the pivot member 114 and the static member 116 when stowed. For example, the hub 160 may include a first hub hinge 166 proximate the pivot member 114 and a second hub hinge 168 proximate the static member 116. A first set (e.g., half) of extension spars 117 and the pivot member 114 may be pivotally coupled to the first hub hinge 166 and a second set (e.g., half) of the extension spars 117 and the static member 116 may be pivotally coupled to the second hub hinge 168. The first and second hub hinges 166, 168 may be positioned a distance apart from each other at opposing sides of the hub 160.

Figure 13:
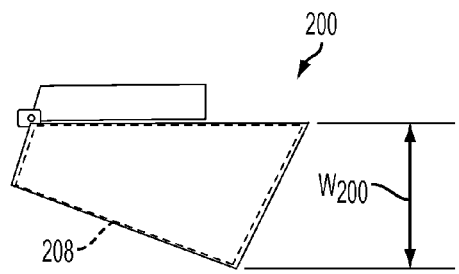
FIG. 13 is a simplified side view of a stowed solar array according to another embodiment of the present disclosure.
Figure 14:
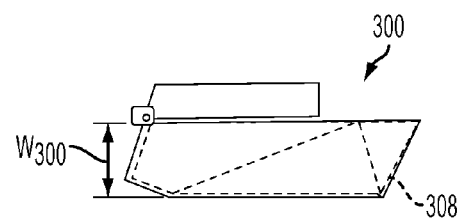
FIG. 14 is a simplified side view of a stowed solar array according to an alternative embodiment of the present disclosure.

FIG. 13 illustrates a schematic view of a stowed solar array 200 according to one embodiment of the present disclosure. FIG. 14 illustrates a schematic view of a stowed solar array 300 according to another embodiment of the present disclosure, to illustrate embodiments in which one or more additional folds in the solar array gores 308 thereof may be used to enable the stowed solar array 300 to have a shorter width. The solar array 200 of FIG. 13 may include gores 208 similar to the gores 108 described above, in that each of the gores 208 may be folded once, approximately along a centerline of the gore 208. The solar array 200 may have a stowed width of $W_{200}$, as shown in FIG. 13. In contrast, the solar array 300 of FIG. 14 may include gores 308 that may be folded more than once to provide the solar array 300 with a shorter width $W_{300}$ than the width $W_{200}$ of the solar array 200 of FIG. 13.

Figure 15:
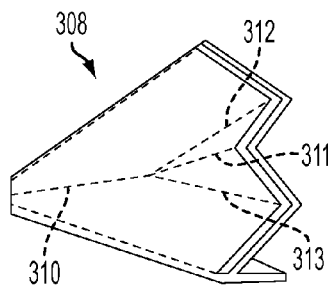
FIG. 15 is a perspective view of a partially unfolded solar array gore of the solar array of FIG. 14.

Referring to FIG. 15, by way of example and not limitation, each gore 308 of the solar array 300 of FIG. 14 may be folded in the manner illustrated. A first fold line 310 may extend approximately along a centerline of the gore 308 from a radially inner portion of the gore 308 toward a radially outer portion of the gore 308 (the radial direction referring to a direction from a center of the fully deployed solar array 300 to an outer edge of the solar array 300). From the perspective shown in FIG. 15, opposing sides of the gore 308 may be folded toward each other along the first fold line 310. A second fold line 311 may also extend approximately along the centerline of the gore 308 from the first fold line 310 to the radially outer portion of the gore 308. Opposing sides of the gore 308 may be folded away from each other along the second fold line 311. A third fold line 312 may extend from the intersection of the first and second fold lines 310, 311 to the radially outer portion of the gore 308. Opposing sides of the gore 308 may be folded toward each other along the third fold line 312. A fourth fold line 313 may also extend from the intersection of the first and second fold lines 310, 311 to the radially outer portion of the gore 308, opposite the third fold line 312 relative to the second fold line 311. Opposing sides of the gore 308 may be folded toward each other along the fourth fold line 313. Thus, the gores 308 of the solar array 300 of FIG. 14 may be include one or more extra folds to reduce the width $W_{300}$ of the solar array 300 when stowed. Although solar cells may be rearranged on the solar array 300 to accommodate the extra folding and the stowed solar array 300 may be thicker to accommodate the additional layers of the gores 308, the solar array 300 may be able to fit within a rocket fairing or other storage structure that has a limited width.

The solar arrays of the present disclosure may include solar cells for harvesting solar energy of any type known in the art. In some embodiments, a single solar array of the present disclosure may be up to about 30 m in diameter when fully deployed, and may have a power generation capacity of about 180 kW using inverted metamorphic multijunction (IMM) solar cells. In some embodiments, additional solar cell efficiency may be realized using techniques known in the art, such as radiation concentration techniques (e.g., focusing solar radiation through a lens, reflecting solar radiation onto the solar cells). The size of the solar array may be selected to reduce the weight and stowed volume of the solar array while providing the required power, depending on the application. In addition, a space vehicle or satellite may use any number of solar arrays, such as one through six solar arrays, based on the power requirements of the space vehicle or satellite. Furthermore, one or more of the gores may lack solar cells on at least a portion thereof to reduce both cost and weight if the particular application has a relatively lower power requirement. Compared to rectangular solar arrays having a similar power capacity, the generally circular solar arrays according to embodiments of the present disclosure may have a reduced moment of inertia and may have shorter solar cell harness (e.g., electrical wiring) lengths, since the generally circular solar arrays may be more compact and located closer to the satellite or space vehicle than rectangular solar arrays exhibiting comparable power outputs.

Additional non-limiting example embodiments of the present disclosure are set forth below.

Embodiment 1: A mechanism for deploying a solar array, the mechanism comprising: an elongated deployment member operatively coupled to a deployment motor and routed along a first panel, along an extension, and at least partially along a second panel, the elongated deployment member configured to, upon retraction of the elongated deployment member by the deployment motor, move the extension into an extended position and rotate the second panel about a hub located at a distal end of the extension.

Embodiment 2: The mechanism of Embodiment 1, wherein the deployment motor is positioned proximate a longitudinal end of the first panel proximate a support structure for supporting the solar array when the first panel is deployed.

Embodiment 3: The mechanism of any one of Embodiments 1 and 2, wherein the extension is pivotally coupled to the first panel and the second panel proximate a longitudinal end of the first panel opposite a support structure for supporting the solar array when the first panel is deployed.

Embodiment 4: The mechanism of any one of Embodiments 1 through 3, further comprising at least one spring configured to retain the extension in the extended position.

Embodiment 5: The mechanism of any one of Embodiments 1 through 4, further comprising one or more springs coupled to the extension, the one or more springs configured to provide a motive force to assist in the movement of the extension into the extended position.

Embodiment 6: The mechanism of any one of Embodiments 1 through 5, wherein the elongated deployment member is further routed around a first elongated deployment member guide positioned proximate a longitudinal end of the first panel opposite a support structure for supporting the solar array when the first panel is deployed, around a second elongated deployment member guide positioned proximate the distal end of the extension, and around a third elongated deployment member guide positioned proximate a longitudinal end of the second panel opposite a support structure for supporting the solar array when the second panel is deployed.

Embodiment 7: The mechanism of any one of Embodiments 1 through 6, further comprising a hinge coupling the solar array to a support structure for supporting the solar array, the first panel and the second panel configured to rotate from a stowed position into a staged position about the hinge, the first panel and the second panel in the staged position oriented at substantially 90° compared to the stowed position.

Embodiment 8: The mechanism of any one of Embodiments 1 through 7, wherein the elongated deployment member being operatively coupled to the deployment motor comprises the elongated deployment member being attached to a drive shaft of the deployment motor.

Embodiment 9: A solar array assembly comprising: a solar array gore assembly comprising: a first panel; a second panel; and a plurality of solar array gores folded and positioned between the first panel and the second panel when the solar array assembly is stowed, the solar array gores extending generally circularly from the first panel to the second panel when the solar array assembly is fully deployed; an extension comprising: a first member pivotally coupled to the first panel; a second member pivotally coupled to the second panel; and a hub pivotally coupling the first member to the second member; and an elongated deployment member configured to, upon initial retraction thereof, rotate the extension relative to the solar array gore assembly into an extended position and, upon further retraction thereof, rotate the second panel and the second member relative to the first panel and the first member to deploy the plurality of solar array gores.

Embodiment 10: The solar array assembly of Embodiment 9, wherein, in a stowed position, the elongated deployment member extends along the first panel, around a first elongated deployment member guide, along the first member of the extension, around a second elongated deployment member guide, along the second member of the extension, and around a third elongated deployment member guide, and is coupled to the second panel.

Embodiment 11: The solar array assembly of any one of Embodiments 9 and 10, further comprising a motor configured to retract the elongated deployment member.

Embodiment 12: The solar array assembly of any one of Embodiments 9 through 11, further comprising: a first retaining mechanism for retaining the first member of the extension in a fully extended position relative to the first panel; and a second retaining mechanism for retaining the second member of the extension in a fully extended position relative to the second panel.

Embodiment 13: The solar array assembly of any one of Embodiments 9 through 12, wherein the solar array gore assembly further comprises a plurality of gore spars, each gore spar positioned between respective adjacent solar array gores of the plurality of solar array gores.

Embodiment 14: The solar array assembly of Embodiment 13, wherein the extension comprises a plurality of extension spars, each extension spar pivotally coupled to a respective gore spar of the plurality of gore spars.

Embodiment 15: The solar array assembly of any one of Embodiments 9 through 14, further comprising one or more releasable retaining elements for coupling the first panel to the second panel and for coupling the first member of the extension to the second member of the extension when the solar array assembly is in a stowed position.

Embodiment 16: A method of deploying a stowed solar array, the method comprising retracting an elongated deployment member using a deployment motor to rotate an extension from a stowed position into an extended position; and further retracting the elongated deployment member using the deployment motor to rotate a panel coupled to the extension approximately 360° about a hub of the extension.

Embodiment 17: The method of Embodiment 16, further comprising moving the panel from an initial stowed position into a staged position prior to retracting the elongated deployment member.

Embodiment 18: The method of Embodiment 17, wherein moving the panel from an initial stowed position into a staged position comprises rotating the panel about a hinge from the initial stowed position into the staged position.

Embodiment 19: The method of any one of Embodiments 16 through 18, wherein further retracting the elongated deployment member further comprises unfolding a plurality of solar array gores.

Embodiment 20: The method of any one of Embodiments 16 through 19, wherein retracting the elongated deployment member using a deployment motor comprises winding a deployment tape around a drive shaft of the deployment motor.

The embodiments of the disclosure described above and illustrated in the accompanying drawing figures do not limit the scope of the invention, since these embodiments are merely examples of embodiments of the disclosure, which is defined by the appended claims and their legal equivalents. Any equivalent embodiments fall within the scope of this disclosure. Indeed, various modifications of the present disclosure, in addition to those shown and described herein, such as alternative useful combinations of the elements described, may become apparent to those skilled in the art from the description. Such modifications and embodiments also fall within the scope of the appended claims and their legal equivalents.

What is claimed is:

1. A mechanism for deploying a solar array, the mechanism comprising:

an elongated deployment member operatively coupled to a deployment motor and routed along a first panel, along a first side of an extension coupled to the first panel, around a distal end of the extension, along a second side of the extension, and at least partially along a second panel coupled to the extension, the elongated deployment member configured to, upon retraction of the elongated deployment member by the deployment motor, move the extension into an extended position relative to the first panel and second panel and rotate the second panel about a hub located at a distal end of the extension.

2. The mechanism of claim 1, wherein the deployment motor is positioned proximate a longitudinal end of the first panel proximate a support structure for supporting the solar array when the first panel is deployed.

3. The mechanism of claim 1, wherein the extension is pivotally coupled to the first panel and the second panel proximate a longitudinal end of the first panel opposite a support structure for supporting the solar array when the first panel is deployed.

4. The mechanism of claim 1, further comprising at least one spring configured to retain the extension in the extended position.

5. The mechanism of claim 1, further comprising one or more springs coupled to the extension, the one or more springs configured to provide a motive force to assist in the movement of the extension into the extended position.

6. The mechanism of claim 1, wherein the elongated deployment member is further routed around a first elongated deployment member guide positioned proximate a longitudinal end of the first panel opposite a support structure for supporting the solar array when the first panel is deployed, around a second elongated deployment member guide coupled to the distal end of the extension, and around a third elongated deployment member guide positioned proximate a longitudinal end of the second panel opposite a support structure for supporting the solar array when the second panel is deployed.

7. The mechanism of claim 1, further comprising a hinge coupling the solar array to a support structure for supporting the solar array, the first panel and the second panel configured to rotate from a stowed position into a staged position about the hinge, the first panel and the second panel in the staged position oriented at substantially 90° compared to the stowed position.

8. The mechanism of claim 1, wherein the elongated deployment member being operatively coupled to the deployment motor comprises the elongated deployment member being attached to a drive shaft of the deployment motor.

9. The mechanism of claim 1, wherein the hub defines a first axis of rotation, wherein the extension is coupled to the first panel and to the second panel with a hinged connection defining a second axis of rotation, and wherein the first axis of rotation is orthogonal to the second axis of rotation.

10. The mechanism of claim 1, wherein the extension comprises a pivot member coupled to a static member via the hub.

* * * * *